United States Patent

Spivy

[15] 3,680,925
[45] Aug. 1, 1972

[54] ENDLESS TRACK
[72] Inventor: Paul L. Spivy, Springfield, Mo.
[73] Assignee: Dayco Corporation, Dayton, Ohio
[22] Filed: April 22, 1971
[21] Appl. No.: 136,431

[52] U.S. Cl. ..........................305/38, 305/24, 305/56
[51] Int. Cl. ...............................................B62d 55/24
[58] Field of Search..........305/35 EB, 37, 38, 56, 55, 305/24

[56] References Cited

UNITED STATES PATENTS

| 1,915,561 | 6/1933 | Van Derveer | 305/55 |
| 3,485,312 | 12/1969 | Swenson | 180/5 R |
| 1,975,725 | 10/1934 | Martinage | 305/35 EB |

FOREIGN PATENTS OR APPLICATIONS

| 832,368 | 6/1938 | France | 305/22 |

Primary Examiner—Richard J. Johnson
Attorney—Reuben Wolk

[57] ABSTRACT

An endless track having a main body made of a resilient elastomeric material is provided and the track is particularly adapted to be supported by a slide rail system and moved in an endless path thereabout. The track utilizes a plurality of bearing members each slidably interlocked to an associated supporting member fixed to the main body and each bearing member is held by its supporting member to prevent movement transverse a longitudinal axis of the associated supporting member. Protrusion means is provided on the main body and arranged outwardly of each supporting member to normally limit outward sliding movement of each bearing member. The resilient main body of the endless track is adapted to be bent locally adjacent each supporting member to move the protrusion means and enable easy sliding interlocking of an associated bearing member to its supporting member and upon releasing the locally bent portion the resilient character of the main body restores the protrusion means to its normal position to limit outward sliding movement of the associated bearing member and enable normal operation of the track.

20 Claims, 7 Drawing Figures

PATENTED AUG 1 1972
3,680,925
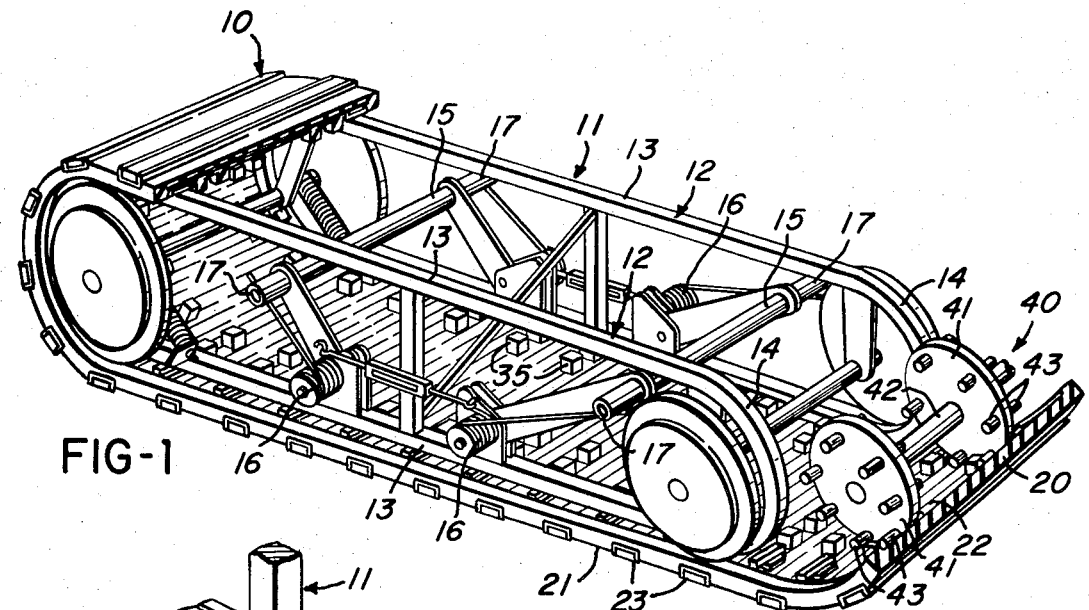
FIG-1
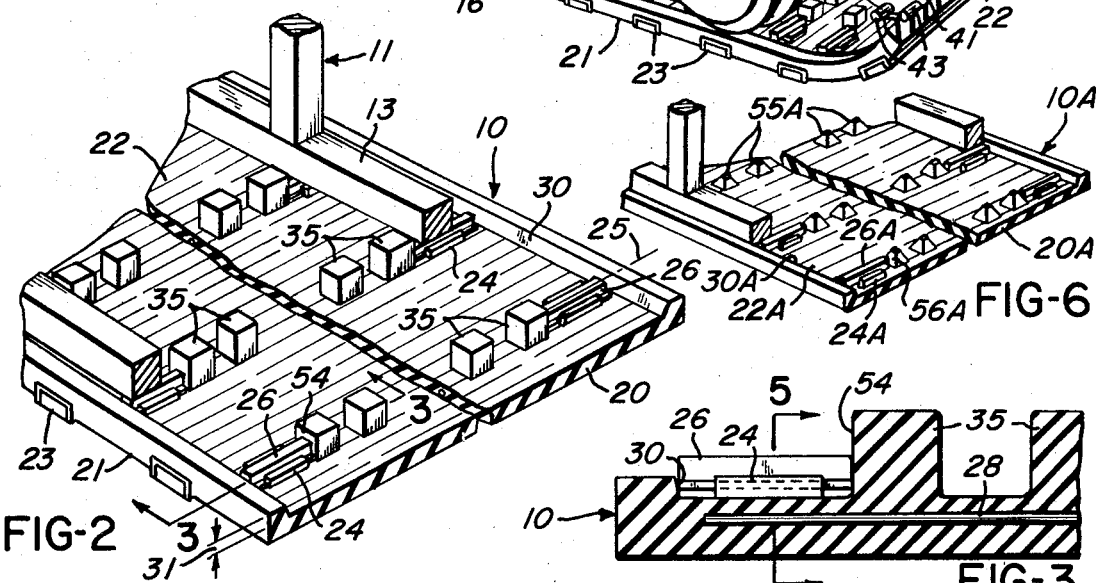
FIG-2
FIG-6
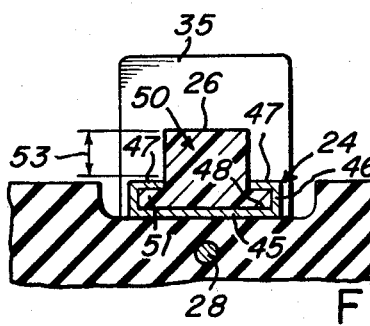
FIG-3
FIG-4
FIG-5
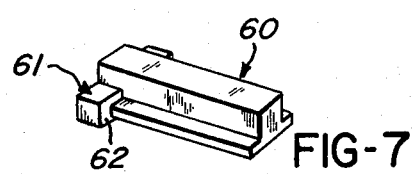
FIG-7
INVENTOR
PAUL L. SPIVY
BY
Reuben Wolk
ATTORNEY

ENDLESS TRACK

BACKGROUND OF THE INVENTION

Endless traction belts or tracks made primarily of elastomeric materials such as natural or synthetic rubber, for example, have been used on snowmobiles, tractors, and similar vehicles and each of these tracks may be supported for movement in its endless path by an associated slide rail system. In moving each of these tracks about a slide rail system it is common practice to utilize bearing members fixed to each track with the bearing members being made of an antifriction material to reduce the wear on each track as well as reduce the power required to drive such a track about its slide rail system; however, these bearing members must be replaced periodically as they wear.

The bearing members employed on presently used endless tracks are difficult to install and remove and often require that the track be removed from its vehicle in order to enable replacement of a worn bearing member. Further, each of these bearing members is often attached in such a manner that the track is damaged in the process of removing and replacing a bearing member.

SUMMARY

This invention provides an improved endless track particularly adapted for use on a slide rail system wherein such track utilizes bearing members that may be rapidly installed on and removed from the track with the track installed on its associated slide rail system even with the slide rail system in position on a vehicle.

In particular, the endless track has a main body made of a resilient elastomeric material and each of its bearing members is slidably interlocked to an associated supporting member fixed to the main body. Each bearing member is held by its supporting member to prevent movement transverse a longitudinal axis of the associated supporting member and protrusion means is provided on the main body and arranged outwardly of each supporting member to normally limit outward sliding movement of each bearing member. The resilient main body of the endless track is adapted to be bent locally adjacent each supporting member to move the protrusion means and enable easy sliding interlocking of an associated bearing member to its supporting member and upon releasing the locally bent portion the resilient character of the main body restores the protrusion means to its normal position to limit outward sliding movement of the associated bearing member and enable normal operation of the track.

Other details, uses, and advantages of this invention will be readily apparent from the exemplary embodiments thereof presented in the following specification, claims, and drawing.

BRIEF DESCRIPTION OF THE DRAWING

The accompanying drawing shows the present preferred embodiments of this invention, in which FIG. 1 is a perspective view with parts in cross section and parts broken away illustrating one exemplary embodiment of an endless track of this invention of the inside-drive type installed on an associated slide rail system.

FIG. 2 is an enlarged fragmentary perspective view of a horizontally arranged portion of the track of FIG. 1 particularly illustrating the arrangement of supporting members and bearing members adjacent each side edge portion of the endless track together with the positions of a pair of horizontal rails comprising the slide rail system;

FIG. 3 is a fragmentary view particularly illustrating a portion of the endless track in cross section and a typical supporting member and bearing member in elevation to highlight the manner in which the bearing member is confined between a projection extending upwardly from the main body of the track adjacent the inner end of the bearing member and protrusion means arranged adjacent the outer end of the bearing member;

FIG. 4 is a view similar to FIG. 3 illustrating the manner in which the main body of the endless track may be bent locally to enable easy removal and/or installation of an associated bearing member;

FIG. 5 is a view taken on the line 5—5 of FIG. 3;

FIG. 6 is a fragmentary perspective view similar to FIG. 2 and illustrating another exemplary embodiment of an endless track of this invention; and FIG. 7 is a perspective view illustrating another exemplary embodiment of a bearing member which may be used on either the track of FIG. 2 or FIG. 6.

DESCRIPTION OF ILLUSTRATED EMBODIMENTS

Reference is now made to FIG. 1 of the drawing which illustrates one exemplary embodiment of an endless traction belt or track of this invention which is designated generally by the reference numeral 10. The track 10 is of the so-called inside-drive type and is particularly adapted to be driven in its endless path about an associated slide rail system which is designated generally by the reference numeral 11.

The slide rail system 11 comprises a pair of spaced rail units 12 and each rail unit includes horizontally arranged upper and lower rails each designated by the same reference numeral 13 and arcuate rail portion 14 adjoining the opposite ends of the horizontal rails 13 of each unit 12.

The rail units 12 with their associated rails 13 and 14 support and guide the endless track 10 for movement in its endless path and the rail units are suitably structurally interconnected to define the high strength slide rail system 11 which is capable of being used on vehicles such as tractors, snowmobiles, and the like. The slide rail system 11 has a pair of transverse supporting rods 15 and each rod 15 is carried by an associated mechanical linkage system and is yieldingly urged upwardly against the upper horizontal rails 13 of the rail units 12 by mechanical springs 16. The opposite ends 17 of each rod 15 are adapted to be fastened in a conventional manner to the main body of a vehicle employing the slide rail system 11 and track 10 and the springs 16 serve to cushion such vehicle.

The track 10 comprises a main body portion or main body 20 which may be made primarily of a resilient elastomeric material such as a natural or synthetic rubber, a suitable plastic, or the like; and in this example the main body 20 is shown as being made of rubber. The track 10 has a ground-engaging surface 21 and an inside surface 22 and the ground-engaging surface 21 has a plurality of traction cleats 23 which are partially embedded in the main body portion 20.

The endless track 10 also employs a plurality of reinforcing rods 28 extending across the major portion of its width, see FIGS. 3—5, and each of these rods is embedded in the main body substantially coplanar with an associated pair of supporting members 24 arranged adjacent opposite side edges of the track 10. The rods 28 have a length which is less than the width of the track 10 to enable local bending of such track adjacent each supporting member for reasons to be described subsequently and such rods also provide added transverse rigidity for the track 10.

As seen particularly in FIGS. 1, 2, and 5, the track 10 has a plurality of supporting members 24 fixed thereto adjacent each side edge of its main body 20 and against at least a part of the inside surface 22. The supporting members 24, of this example, are arranged in a pair of endless paths corresponding to the endless path of the track 10 and each supporting member 24 has a longitudinal axis, indicated at 25 in FIG. 2, for a typical supporting member 24, which is arranged transverse the endless path of the track 10.

The track 10 also has a plurality of bearing members 26 and each member 26 is slidably interlocked to an associated supporting member 24 so that movement transverse the longitudinal axis 25 of the supporting member 24 is prevented. The bearing members 26 are restrained against axial sliding movements either inwardly toward the center of the track 10 or outwardly toward a near side edge thereof in a simple and unique manner and as will be described in detail hereinafter.

The track 10 has protrusion means on the main body 20, which, in this example, is in the form of a raised shoulder 30 defined by an increased thickness side edge portion of the main body 20 and such increased thickness is indicated at 31. The protrusion means or shoulder 30 extends along the entire endless path of the track and is made of the same elastomeric material comprising the main body 20. The shoulder 30 is arranged outwardly of each supporting member and with each bearing member 26 slidably interlocked to its associated supporting member 24 the shoulder 30 normally limits outward sliding movement of each bearing member 26 along the longitudinal axis 25 of its supporting member 24.

The main body 20 is adapted to be locally bent or forced outwardly as illustrated at 33 in FIG. 4 causing the shoulder or protrusion means 30 to be moved beneath the innermost surface of an associated bearing member 26 as illustrated at 34 enabling each bearing member 26 to be axially slidably interlocked within its supporting member 24 or remove therefrom. Thus, in a new endless track 10 each bearing member 26 may be easily installed in position in this manner by applying a force, using any suitable means or tool, against the outer portion of the main body adjacent each supporting member to slidably interlock an associated bearing member 26 in position. Once a particular bearing member 26 is axially slid along its supporting member the required distance as illustrated in FIG. 3, the locally bent portion is released and the resilient character of the elastomeric material comprising the main body 20 causes the shoulder 30 to return to its normal unbent position of FIG. 3 to thereby limit outward sliding movement of the bearing member 26 and hold it in position during normal operation of the track 10 about its associated slide rail system 11.

However, as previously indicated, the bearing members 26 wear with extended usage and once a particular bearing member 26 has worn excessively it is a simple procedure to locally deflect the main body of the belt adjacent the supporting member 24 carrying the worn bearing member whereby the worn member can be slidably removed and a new member installed in position.

As previously indicated, the track 10 is of the inside-drive type. Accordingly, such track has a plurality of pairs of projections extending outwardly from the inside surface 22 of its main body 20 and each projection is designated by the reference numeral 35 and is arranged in aligned relation with the longitudinal axis 25 of an associated supporting member 24. One of the projections 35 of each pair, i.e., the outermost projection or the projection arranged close to the near side edge of the track 10, limits inward (toward the center of the track) sliding movement of an associated bearing member 26 along the longitudinal axis of its supporting member 24.

The track 10 is particularly adapted to be driven about the slide rail system 11 by an associated inside-type drive sprocket assembly 40. The drive sprocket assembly 40 includes a pair of identical drive sprockets 41 fixed adjacent opposite ends of a shaft 42 which is suitably rotatably supported by the vehicle utilizing the track 10 and slide rail system 11. A mechanical drive, not shown, is provided for driving the shaft 42 and, hence, the assembly 40 with its drive sprockets 41. Each drive sprocket 41 has a plurality of driving projections 43 extending outwardly from opposite sides of its central disc-like portion and the driving projections 43 engage associated projections 35 extending from the main body 20 to drive the track 10 in its endless path about the slide rail system 11. The projections 35 are preferably provided as an integral part of the main body 20 and of the same elastomeric material comprising such body.

As previously explained, each bearing member 26 is slidably interlocked with an associated supporting member 24 and the members 24 and 26 may have any suitable configuration for this purpose. However, in the exemplary track 10 each supporting member 24 has a roughly U-shaped cross-sectional configuration defined by a bight 45, see FIG. 5, which has a pair of outwardly extending legs 46 adjoining opposite ends of the bight and a pair of arms 47 extending inwardly from the terminal outer ends of the legs 46 to thereby define channel or groove means 48 in the supporting member 24. The bearing member 26 has a roughly T-shaped cross-sectional configuration defined by a vertical leg 50 adjoined at one end by a transverse arm 51 and the arm 51 is dimensioned so that it is slidably received within the groove means 48 with the leg 50 extending between and outwardly from the terminal inner ends of the arms 47. Thus, the bearing member 26 has a portion of substantial thickness indicated at 53 which enables prolonged use of the track 10 about its slide rail system 11 before such thickness has worn sufficiently to require replacement of the worn member 26.

The integral projections 35 comprising the track 10 of this example are shown as being substantially cubical in configuration and are defined as an integral part of the main body 20. The cubical configuration provides a wall 54 which extends substantially perpendicular to the inside surface 22 and the area and arrangement of wall 54 ensure that the inner end of the bearing member 26 is prevented from moving inwardly.

Another exemplary embodiment of an endless track of the inside-drive type is illustrated in FIG. 6 of has a substantially frustopyramidal configuration with converging outwardly inclined walls 56A and each projection 55A is defined as an of FIG. 6 is very similar to the track 10, therefore, such track will be designated generally by the reference numeral 10A and representative parts of the track 10A which are similar to corresponding parts of the track 10 will be designated by the same reference numeral as in the track 10 followed by the letter designation A and not described again. The track 10A differs from the track 10 only in the integral driving projections, which will be each designated by the reference numeral 55A, extending from the inside surface 22A of its main body 20A.

In particular, instead of being cubical as in the case of track 10 each driving projection 55A is defined as an integral part of the main body portion 20A. The frustopyramidal configuration enables a drive sprocket assembly similar to the sprocket assembly 40 to drive the track 10A in a more efficient manner yet the inclined wall 56A of a projection 55A which corresponds to the wall 54 of projection 35 still limits inward movement of an associated bearing member 26A in the desired manner while protrusion means or shoulder 30A limits or confines each bearing members 26A against outward axial movement. The bearing members 26A of track 10A may be slidably removed and slidably interlocked on their associated supporting members 24A in a similar manner as explained in detail in connection with bearing members 26 and supporting members 24 of the track 10.

The tracks 10 and 10A use projections 35 and 55A respectively to limit inward movement of bearing members 26 and 26A respectively. However, it will be appreciated that the concept of this invention of providing a bearing member which is easily installed and removed yet is easily held in position need not necessarily employ means such as projections 35 and 55A to limit inward movement thereof.

For example. A bearing member 60 of the type illustrated in FIG. 7 of the drawing may be used on each of the tracks 10 and 10A and member 60 is substantially identical to the members 26 and 26A with the exception that it has a head portion 61 either fixed to or made as an integral part of one end thereof. The head portion 61 is constructed with an inner surface 62 which is particularly adapted to engage the outer edge of an associated supporting member, either 24 or 24A, to limit axial movement of member 60 inwardly toward the center of its associated track. The head portion 61 cooperates with a projection such as projection 35 or 55A to assure the bearing member 60 is prevented from moving axially inwardly.

It will also be appreciated that inserts such as the insert 60 may be employed in endless traction belts or tracks which are not of the inside-drive type and thus are minus projections such as projections 35 and 55A. For example, each track may have aligned openings therein which are adapted to receive teeth of a drive sprocket therethrough in a conventional manner to enable driving such track about a slide rail system. With such a construction the bearing members 60 would still retain their characteristics of being easily removed and installed in a similar manner as illustrated in FIG. 4 for bearing members 26. Further, a shoulder or protrusion means, similar to the shoulder 30 of track 10, would still be used to prevent outward sliding movement of the bearing members from such a track.

Each supporting member 24 and 24A for the tracks 10 and 10A respectively may be fixed to its track using any suitable technique or means known in the art.

Each bearing member 26, 26A, or 60 may be made of any suitable material which has antifriction properties yet provides optimum wear so that as its associated track is moved about the rails of a slide rail system movement may be accomplished with minimum frictional resistance and without the need to constantly replace worn bearing members. In one application of this invention the bearing members were made of a hard plastic antifrictional material. In addition, it will be appreciated that each bearing member may have its outside surface suitably treated with a layer or coating of an antifriction material to provide antifriction properties. Further, the exposed surfaces of the slide rails which come into contact with the various bearing members preferably are provided with suitable means in the form of outer layers or strips fixed thereto to reduce the frictional drag as each track is moved along the slide rails.

In this disclosure the various bearing members are shown with projections which are slidably interlocked within cooperating groove means or channels in associated supporting members. However, it will be appreciated that, if desired, this sliding interlocking arrangement may be reversed with the groove means provided in the bearing members and the projections in the associated supporting members.

While present exemplary embodiments of this invention, and methods of practicing the same, have been illustrated and described, it will be recognized that this invention may be otherwise variously embodied and practiced within the scope of the following claims.

What is claimed is:

1. An endless track adapted to be moved in an endless path and comprising, a main body comprised of a resilient elastomeric material and having a ground engaging surface and an inside surface, a plurality of supporting members each fixed adjacent a side edge of said main body against a part of said inside surface, each of said supporting members having a longitudinal axis arranged transverse said endless path and being arranged in an associated row thereof which extends in said endless path, a plurality of bearing members each slidably interlocked to an associated supporting member to prevent movement transverse the longitudinal axis of its associated supporting member, each of said bearing members having an outside bearing surface which is adapted to engage rails of an associated slide rail system for said track in a substantially frictionless manner, and protrusion means on said body portion arranged outwardly of each supporting member and normally limiting outward sliding movement of each bearing member along the longitudinal axis of its supporting member, said main body being adapted to be locally bent to move said protrusion means enabling easy sliding interlocking of an associated bearing member and upon releasing the locally bent portion the resilient character of said main body restores said protrusion means to its normal position to limit sliding movement of the associated bearing member.

2. A track as set forth in claim 1 in which each of said bearing members is made of a rigid antifriction material.

3. A track as set forth in claim 1 in which said protrusion means comprises a raised shoulder defined by an increased thickness side edge portion of said main body.

4. A track as set forth in claim 3 in which said raised shoulder has a substantially continuous height and extends along the entire endless path of said track.

5. A track as set forth in claim 1 in which said plurality of supporting members comprise a set thereof adjacent a side edge portion of said track and said plurality of bearing members comprise another set cooperating with said first named set with each member of one set having groove means therein and each member of the other set having cooperating interlocking projection means, said groove means and projection means of associated members being slidably interlocked to slidably interlock each bearing member to its supporting member.

6. A track as set forth in claim 1 wherein each supporting member has groove means therein and each bearing member has cooperating interlocking projection means adapted to be slidably received and interlocked in the groove means of an associated supporting member.

7. A track as set forth in claim 6 in which each of said bearing members has a T-shaped cross-sectional configuration defining said cooperating interlocking projection means.

8. A track as set forth in claim 6 in which each of said bearing members also has a head at one end thereof, said head being adapted to engage the outer edge of its associated supporting member to limit inward movement of the bearing member.

9. A track as set forth in claim 1 and further comprising a plurality of projections each extending outwardly from said inside surface and each being arranged in aligned relation with the longitudinal axis of an associated supporting member, wherein certain ones of said projections limit inward sliding movement of an associated bearing member along the longitudinal axis of its supporting member.

10. A track as set forth in claim 1 and further comprising a plurality of pairs of projections each extending outwardly from said inside surface and each being arranged in aligned relation with a longitudinal axis of an associated supporting member, one of said projections of each pair limiting inward sliding movement of an associated bearing member along the longitudinal axis of its supporting member, each pair of projections being adapted to be engaged and driven by an associated inside-type drive sprocket for driving said track about said slide rail system.

11. An endless track of the inside-drive type adapted to be moved in an endless path and comprising, a main body comprised of a resilient elastomeric material and having a ground engaging surface and an inside surface, a plurality of supporting members each fixed adjacent a side edge of said main body against a part of said inside surface, each of said supporting members having a longitudinal axis arranged transverse said endless path and being arranged in an associated row thereof which extends in said endless path, a plurality of bearing members each slidably interlocked to an associated supporting member to prevent movement transverse the longitudinal axis of its associated supporting member, each of said bearing members having an outside bearing surface which is adapted to engage rails of an associated slide rail system for said track in a substantially frictionless manner, protrusion means on said body portion arranged outwardly of each supporting member and normally limiting outward sliding movement of each bearing member along the longitudinal axis of its supporting member, said main body being adapted to be bent locally adjacent each supporting member to move said protrusion means enabling easy sliding interlocking of an associated bearing member and upon releasing the locally bent portion the resilient character of said main body restores said protrusion means to its normal position to limit outward sliding movement of the associated bearing member, and a plurality of pairs of projections each extending outwardly from said inside surface and each being arranged in aligned relation with a longitudinal axis of an associated supporting member, one of said projections of each pair limiting inward sliding movement of each bearing member along the longitudinal axis of its supporting member, each pair of projections being adapted to be engaged and driven by an associated drive sprocket for said inside-type drive endless track to enable driving said track about said slide rail system.

12. A track as set forth in claim 11 in which each projection is made of the same resilient elastomeric material comprising said main body and as an integral part of said main body.

13. A track as set forth in claim 11 in which each of said bearing members is made of a rigid antifriction material.

14. A track as set forth in claim 11 in which said protrusion means comprises a raised shoulder defined by an increased thickness side edge portion of said main body.

15. A track as set forth in claim 11 in which each projection has a substantially cubical configuration.

16. A track as set forth in claim 11 in which each projection has a substantially frustopyramidal configuration.

17. A track as set forth in claim 11 wherein each supporting member is in the form of a roughly U-shaped member having a bight fixed against said inside surface, a pair of outwardly extending legs adjoining opposite ends of said bight, and a pair of arms extending toward each other from the terminal outer ends of said legs to define groove means in each supporting member, and each bearing member has a roughly T-shaped cross-sectional configuration having a transverse arm which is received within the volume defined by the inside surfaces of the bight, legs, and arms, and a vertical leg which extends upwardly between and outwardly of the terminal ends of the arms of its associated supporting member.

18. A track as set forth in claim 17 wherein said main body is made of rubber and each bearing member is made of a hard plastic antifriction material.

19. A track as set forth in claim 18 in which each of said bearing members also has a head at one end provided as an integral part thereof, said head being adapted to engage the outer edge of its supporting member to help limit inward movement of the bearing member.

20. A track as set forth in claim 11 and further comprising a plurality of rods embedded in said main body in spaced parallel relation and providing transverse rigidity for said track, said rods having a length which is less than the width of said track to enable said local bending.

* * * * *

PO-1050
(5/69)

UNITED STATES PATENT OFFICE
CERTIFICATE OF CORRECTION

Patent No. 3,680,925      Dated August 1, 1972

Inventor(s) Paul L. Spivy

It is certified that error appears in the above-identified patent and that said Letters Patent are hereby corrected as shown below:

Column 5, lines 10-13, delete "has a substantially frustopyramidal configuration with converging outwardly inclined walls 56A and each projection 55A is defined as an" and insert therefor --- the drawing. The track ---

Column 5, line 25, after "55A" insert --- has a substantially frusto-pyramidal configuration with converging outwardly inclined walls 56A and each projection 55A ---

Column 5, line 34, "members" should be --- member ---

Signed and sealed this 24th day of April 1973.

(SEAL)
Attest:

EDWARD M. FLETCHER, JR.
Attesting Officer

ROBERT GOTTSCHALK
Commissioner of Patents